(12) United States Patent
Tojo et al.

(10) Patent No.: US 10,887,481 B2
(45) Date of Patent: Jan. 5, 2021

(54) IMAGE FORMING APPARATUS AND NON-TRANSITORY COMPUTER READABLE MEDIUM STORING PROGRAM

(71) Applicant: FUJI XEROX CO., LTD., Tokyo (JP)

(72) Inventors: Takahiro Tojo, Kanagawa (JP); Hiroaki Komatsu, Kanagawa (JP); Takahiro Shiomi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/540,569

(22) Filed: Aug. 14, 2019

(65) Prior Publication Data
US 2020/0296226 A1    Sep. 17, 2020

(30) Foreign Application Priority Data
Mar. 13, 2019   (JP) .................................. 2019-045940

(51) Int. Cl.
*H04N 1/00* (2006.01)

(52) U.S. Cl.
CPC ....... *H04N 1/0048* (2013.01); *H04N 1/00472* (2013.01); *H04N 1/00689* (2013.01); *H04N 1/00694* (2013.01); *H04N 1/00708* (2013.01)

(58) Field of Classification Search
CPC ............. H04N 1/0048; H04N 1/00708; H04N 1/00472; H04N 1/00694; H04N 1/00689

USPC ....................................................... 358/1.14
See application file for complete search history.

(56) References Cited

U.S. PATENT DOCUMENTS

2017/0308019 A1*  10/2017  Nishino  ............. H04N 1/00708

FOREIGN PATENT DOCUMENTS

JP          2013-121680 A       6/2013

* cited by examiner

*Primary Examiner* — Saeid Ebrahimi Dehkordy
(74) *Attorney, Agent, or Firm* — Oliff PLC (57) ABSTRACT

An image forming apparatus includes: an execution unit that, when a specific execution instruction is received, which specifies that a manual sheet feed section via which a sheet is fed manually is included as a sheet feed source that feeds the sheet, under the condition that the sheet is present in the manual sheet feed section, executes specific printing; and a confirmation unit that, when the execution unit executes first specific printing according to a first specific execution instruction, then receives a second specific execution instruction from an operator different from an operator who has issued the first specific execution instruction, under the condition that the sheet is present in the manual sheet feed section, confirms with the different operator whether the sheet is allowed to be fed from the manual sheet feed section before the execution unit executes second specific printing according to the second specific execution instruction.

11 Claims, 5 Drawing Sheets

FIG. 4B ized Patent Application Publication No. 2013-121680).

IMAGE FORMING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-045940 filed Mar. 13, 2019.

BACKGROUND (i) Technical Field

The present disclosure relates to an image forming apparatus and a non-transitory computer readable medium storing a program.

(ii) Related Art

In recent years, an image forming apparatus has been proposed that improves the convenience of a user when an image is printed on a manually set recording medium in the case where printing is executed according to an instruction from the user based on pre-stored print data (see, for instance, Japanese Unexamined Patent Application Publication No. 2013-121680).

In the image forming apparatus described in Japanese Unexamined Patent Application Publication No. 2013-121680, when an instruction for printing is received based on the print data stored in BOX, MP tray fixed processing is performed, which is an operation of forcibly supplying a recording medium from an MP tray to a printer when setting of the recording medium in the MP tray is detected by a manual feed medium sensor. When the MP tray fixed processing is performed, even if the attribute of a recording medium included in the print data does not conform with the attribute of a recording medium set by an attribute setting unit, printing is continued.

SUMMARY

Aspects of non-limiting embodiments of the present disclosure relate to provide an image forming apparatus and a non-transitory computer readable medium storing a program that, when a sheet is present in a manual sheet feed section after execution of printing on a sheet fed from the manual sheet feed section via which a sheet is fed manually, are capable of cancelling feeding of a sheet from the manual sheet feed section according to an execution instruction of an operator different from an operator who has instructed printing after the execution.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including:

an execution unit that, when a specific execution instruction is received, which specifies that a manual sheet feed section via which a sheet is fed manually is included as a sheet feed source that feeds the sheet, under the condition that the sheet is present in the manual sheet feed section, executes specific printing by preferentially feeding the sheet from the manual sheet feed section for printing; and a confirmation unit that, when the execution unit executes first specific printing according to a first specific execution instruction, then receives a second specific execution instruction from an operator different from an operator who has issued the first specific execution instruction, under the condition that the sheet is present in the manual sheet feed section, confirms with the different operator whether the sheet is allowed to be fed from the manual sheet feed section before the execution unit executes second specific printing according to the second specific execution instruction.

BRIEF DESCRIPTION OF THE DRAWINGS

Exemplary embodiment of the present disclosure will be described in detail based on the following figures, wherein.

DETAILED DESCRIPTION

Hereinafter, an exemplary embodiment of the present disclosure will be described with reference to the drawings. It is to be noted that components having substantially the same function in the drawings are labeled with the same symbol, and a redundant description thereof will be omitted.

Exemplary Embodiment

Figure 1:
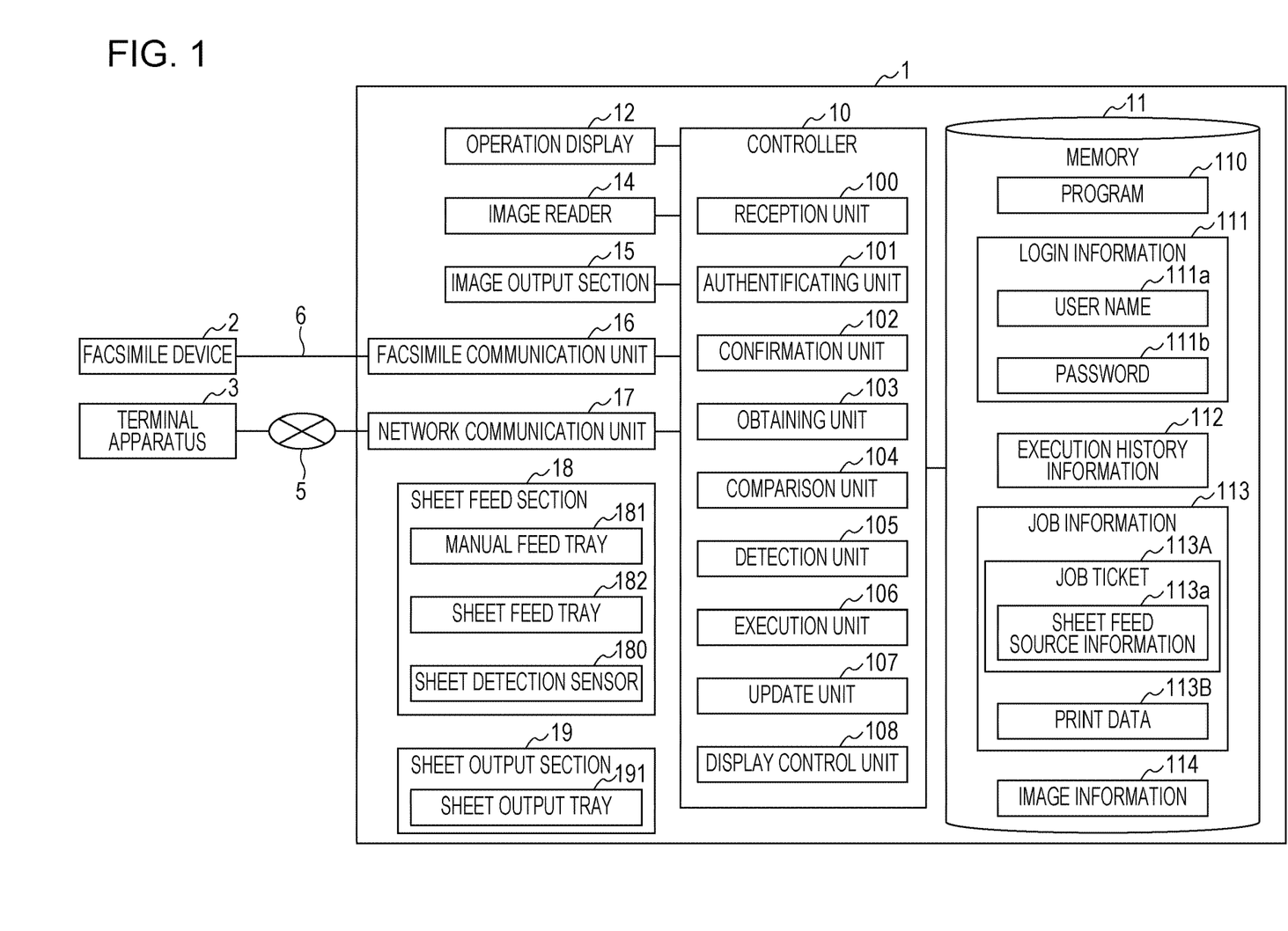
FIG. 1 is a block diagram illustrating an example of a control system of an image forming apparatus according to an exemplary embodiment of the present disclosure.

FIG. 1 is a block diagram illustrating an example of a control system of an image forming apparatus according to an exemplary embodiment. An image forming apparatus 1 is a multifunctional apparatus having multiple functions such as a scanning function, a printing function, a copying function, a facsimile function, and an electronic mail function. It is to be noted that a multifunctional apparatus is an example of the image forming apparatus 1, and the image forming apparatus 1 is not limited to a multifunctional apparatus.

The image forming apparatus 1 includes a controller 10 that controls units, a memory 11 that stores various types of data, an operation display 12 that receives input of information and displays information, an image reader 14 that reads a document image from a document, an image output 15 that outputs an image by printing, a facsimile communication unit 16 that transmits and receives facsimile data to and from an external facsimile device 2 via a public line network 6, a network communication unit 17 that communicates with a terminal apparatus 3 via a network 5, a sheet feed section 18 that feeds a sheet for printing, and a sheet output section 19 to which a printed sheet is outputted.

A mobile information terminal, such as a personal computer, a tablet terminal, and a multifunctional mobile phone (smartphone), may be used as the terminal apparatus 3. The network 5 is, for instance, a local area network (LAN), a wide area network (WAN), an internet, or an intranet, and may a wired or wireless network.

The controller 10 is configured by a central processing unit (CPU), an interface, and others. The CPU operates in accordance with a program 110 stored in the memory 11, thereby serving as a reception unit 100, an authenticating unit 101, a confirmation unit 102, an obtaining unit 103, a comparison unit 104, a detection unit 105, an execution unit 106, an update unit 107, and a display control unit 108. The details of the units 100 to 108 will be described later.

Figure 2:
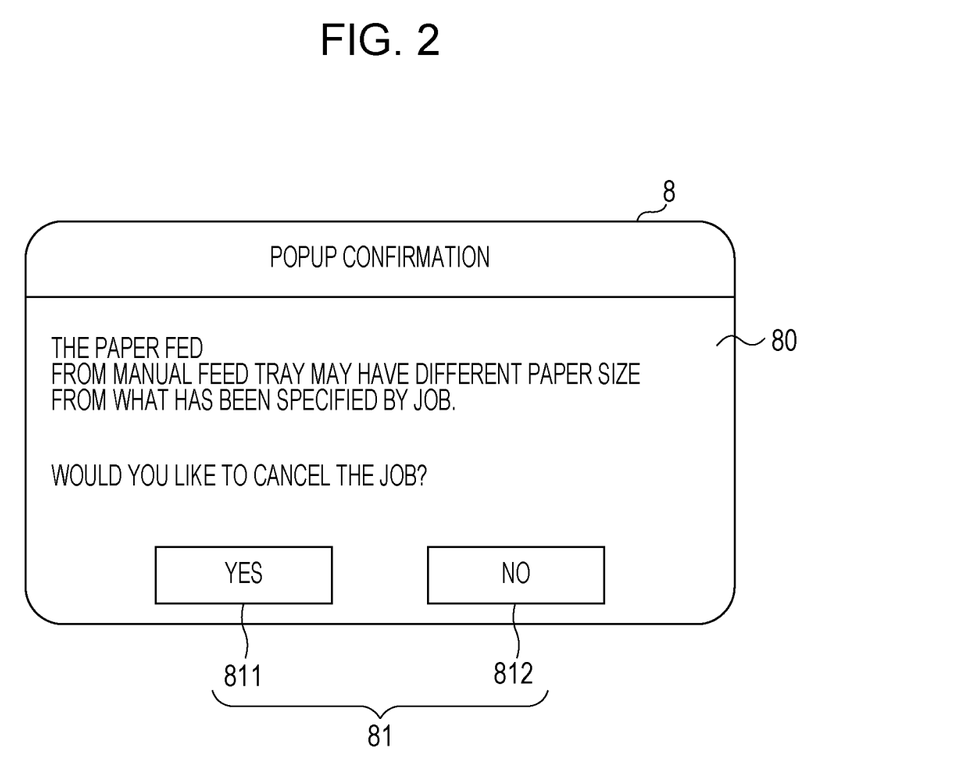
FIG. 2 is a view illustrating an example of a confirmation screen.

The memory 11 includes a read only memory (ROM), a random access memory (RAM), and a hard disk, and stores various type of data such as login information 111, execution history information 112, job information 113, and image information 114 (see FIG. 2).

The operation display 12 is, for instance, a touch panel display, and has a configuration in which a touch panel is disposed on a display such as a liquid display in an overlapped manner.

The image reader 14 reads an image from a document, and includes an automatic document feeder (not illustrated) provided on a platen (not illustrated), and a scanner (not illustrated). The image reader 14 optically reads an image from a document placed on the platen or a document fed by the automatic document feeder.

The image output 15 outputs a color image or a monochrome image to a recording medium (hereinafter collectively referred to as a "sheet" simply) such as a sheet of paper, a transparent film, and a metallic sheet by the electrophotographic system or the inkjet system, for instance.

The facsimile communication unit 16 modulates or demodulates data in accordance with a facsimile protocol such as G3, G4, and performs facsimile communication via the public line network 6. The network communication unit 17 is implemented by a network interface card (NIC) or the like, and transmits and receives a signal to and from the terminal apparatus 3 via the network 5.

The sheet feed section 18 includes, for instance, a sheet feed source (also referred to as a "manual feed tray") 181 for manually feeding a sheet by a user, and a sheet feed tray 182 which is classified according to attribute information such as a size of a sheet and a sheet quality. Multiple sheet feed trays 182 may be provided. In the exemplary embodiment, the sheet feed section 18 further includes a sheet detection sensor 180 that detects whether a sheet is present in the manual feed tray 181. The manual feed tray 181 is an example of a manual sheet feed section. The sheet feed tray 182 is an example of a sheet feed section other than the manual sheet feed section. The sheet output section 19 includes a sheet output tray 191.

[Pieces of Information 111 to 114]

Next, the details of the pieces of information 111 to 114 stored in the memory 11 will be described. The login information 111 is authentification information which is collated when an operator (hereinafter also referred to as a "user") logins the image forming apparatus 1. For instance, a username 111a and a password 111b are recorded in the login information 111 in association with each other.

The execution history information 112 is information which records a history of execution of processing (in the exemplary embodiment, an example of printing is taken as the "processing" unless otherwise stated). Specifically, the execution history information 112 records information (hereinafter also referred to as "user information" simply) that identifies a user who instructs execution of printing in association with information that identifies an execution instruction (hereinafter also referred to as a "print job" or a "job" simply) which instructs execution of printing.

The user information may be obtained, for instance, from information on a user who has logged in the image forming apparatus 1, in other words, the login information 111, or the IP address of the terminal apparatus 3 which has transmitted a job.

The job information 113 records information related to a print job. The job information 113 includes a job ticket 113A which records attribute information related to execution of printing, and information (hereinafter also referred to as "print data" simply) on an object to be printed. The job ticket 113A configurates, for instance, header information of the job.

The job ticket 113A includes, for instance, the following information.

(A) attribute information indicating the attribute of the job.
(a1) filename indicating the name of a file to be printed.
(a2) information indicating a user who has instructed execution of printing.
(B) execution conditions for executing processing.
(b1) execution conditions (setting items (also referred to as "options") and setting values (also referred to as "parameters") for executing printing.
    imposition
    number of copies
    color mode
    specification of single-sided/double-sided
(b2) specification of sheet
    sheet feed source information 113a indicating a sheet feed source from which a sheet is fed.
    output destination information on a destination to which a printed sheet is outputted.
(b3) instructions for postprocessing
    punching
    stapling
    needle clamp
    bending
    binding Print data 113B is data described by a page description language (PDL) which can be interpreted by the image forming apparatus 1. The PDL includes multiple types of languages which are outputted in different formats, such as Portable Document Format (PDF), PostScript (registered trademark), and Printer Command Language (PCL).

The image information 114 provides information on various types of screens displayed on a display surface (not illustrated) of the operation display 12 by the later-described display control unit 108. FIG. 2 is a view illustrating an example of a confirmation screen. As illustrated in FIG. 2, a confirmation screen 8 includes notification information 80, and a selection button 81 for selecting whether the job is cancelled, the notification information 80 notifying a user that there is a case where printing may not be executed with an expected sheet if printing is started under the current conditions (in other words, there is a possibility of execution of printing with a sheet having unintended size and quality).

The selection button 81 includes, for instance, a button 811 for instructing cancellation of printing, on which the affirmative word "YES" is displayed, and a button 812 for instructing continuation of printing, on which the negative word "NO" is displayed. The confirmation screen 8 may be controlled and displayed in a popup format.

[Units 100 to 108]

Next, the details of the units 100 to 108 included in the controller 10 will be described. The reception unit 100 receives a print job transmitted from the terminal apparatus 3. In response to an authentification request (for instance, a login operation to the image forming apparatus 1, or an operation of transmitting a job from the terminal apparatus 3) from a user, the authenticating unit 101 authenticates the user by collating inputted username and password with the login information stored in the memory 11.

The confirmation unit 102 confirms whether user information of a job being executed is obtainable. It is to be noted that the case where the user information of a job being executed is not obtainable includes a case where user information is inaccessible due to a communication failure or a failure of the image forming apparatus 1.

When the user information of the job being executed is obtainable, the obtaining unit 103 obtains the user information. In addition, the obtaining unit 103 records the obtained user information in the execution history information 112 of the memory 11 in association with the job.

It is to be noted that in the case where the user information of the job being executed is not obtainable, for instance, "initial state" is recorded in the execution history information 112 in association with the job currently being executed. The "initial state" refers to a state in which a predetermined condition (in other words, the "initial condition") is set. Specifically, in the "initial state", printing is executed on a sheet preferentially fed from the manual feed tray 181 in the later-described bypass mode.

The comparison unit 104 compares the user information of the job currently being executed (hereinafter also referred to as the "current user information") with the user information of a previous job (hereinafter also referred to as the "previous user information"). Here, the "previous" refers to immediate before the current execution, and the "previous job" refers to the job already executed (regardless of whether execution has been completed normally or execution has been interrupted in mid-course) immediately before the job currently being executed. In the comparison, the obtaining unit 103 refers to the execution history information 112 of the memory 11, and obtains the previous user information.

The detection unit 105 controls the sheet detection sensor 180, and specifically detects whether a sheet is present in a sheet feed outlet (not illustrated) of the manual feed tray 181.

The execution unit 106 controls the image reader 14, the image output 15, and the facsimile communication unit 16, and executes processing. The update unit 107 rewrite the execution history information 112 each time a job is executed. The display control unit 108 controls the operation display 12 so that the screen recorded in the screen information 114 is displayed on the display surface of the operation display 12.

(Operation of Exemplary Embodiment)

Next, an example of operation of the image forming apparatus 1 will be described. In the following description of the operation, it is assumed that when both two conditions mentioned below are met, printing is executed on a sheet preferentially fed from the manual feed tray in a mode (also referred to as a "bypass mode"). The bypass mode is an example of specific printing.

Condition 1: tray automatic selection is specified by the job.
Condition 2: a sheet is present in the manual feed tray. It is to be noted that the "tray automatic selection" of the condition 1 indicates that "automatic selection" is specified in the sheet feed source information 113*a* included in the job information 113 of the job being executed. Here, the "automatic selection" indicates that a specific sheet feed tray is not specified as the sheet feed source, and a sheet feed tray is selected according to the attribute of print data such as a sheet size and a sheet quality, and a sheet is fed. A print job specified to meet the conditions 1 and 2 is an example of the specific execution instruction.

when the above-described two conditions are met, the execution unit 106 is designed to feed a sheet from the manual feed tray 181 without exception to perform printing regardless of the size of output of printing and the size of a document image. In other words, when the above-described two conditions are met, the execution unit 106 is designed to execute printing even when the size of output of printing or the size of a document image does not conform with the sheets set in the manual feed tray 181. The size of output of printing and the size of a document image is an example of the attribute of an object to be printed.

Hereinafter the operation of the image forming apparatus 1 is divided into (1) the operation of detecting refeed of a sheet to the manual feed tray and (2) the operation of printing by the image forming apparatus 1, and each operation will be described.

(1) Operation of Resetting User Information

Figure 3:
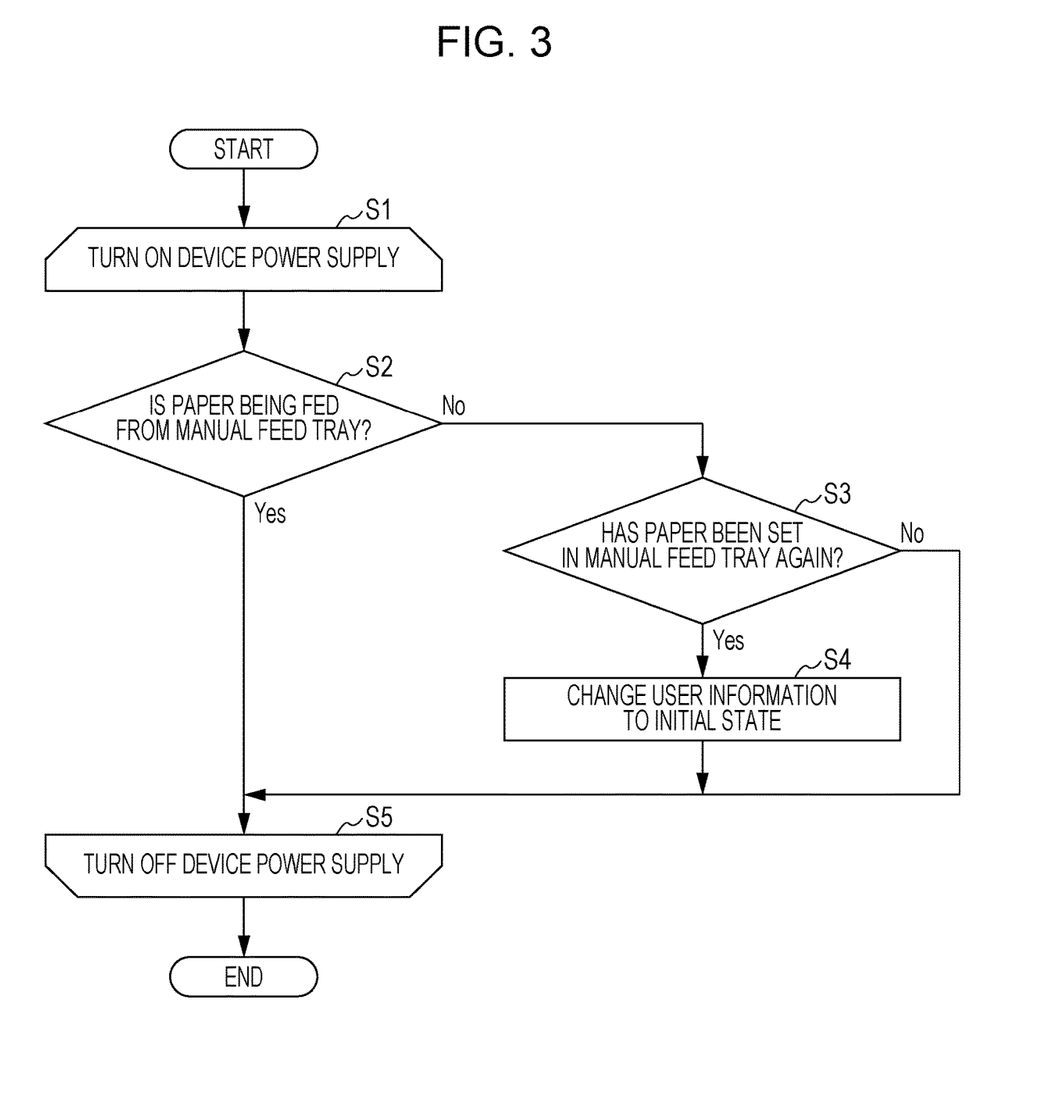
FIG. 3 is a flowchart illustrating an example of an operation of resetting user information of the image forming apparatus illustrated in FIG. 1.

FIG. 3 is a flowchart illustrating an example of the operation of resetting the user information of the image forming apparatus 1. When the power supply of the image forming apparatus 1 (hereinafter also referred to as the "device") is turned on (S1), it is determined whether printing is being executed (hereinafter also simply referred to as "during feeding a sheet from the manual feed tray") by feeding a sheet from the manual feed tray. When printing is not during feeding a sheet from the manual feed tray (No in S2), the detection unit 105 detects whether a sheet is referred to the manual feed tray (S3).

When a sheet is referred to the manual feed tray (Yes in S3), the update unit 107 changes the user information to the initial state (S4). In other words, the update unit 107 resets the user information. The operation of resetting the user information is repeated with certain time intervals until the power supply of the device is turned off (S5), in other words, as long as the power supply of the device is on.

In the case where the reception unit 100 receives an automatic tray selection job (a job in which the later-described tray automatic selection is specified) transmitted from a different user, during execution of a job in which a sheet feed tray 182 other than the manual feed tray 181 is specified in the sheet feed source information 113*a*, when a sheet is newly set in (in other words, added to) the manual feed tray 181 during standby of printing of the automatic tray selection job, the detection unit 105 detects that a sheet is newly set in (in other words, added to) the manual feed tray 181, and the update unit 107 resets the user information.

It is to be noted that particularly in a state where a sheet is present in the manual feed tray 181, in the case where the reception unit 100 receives an automatic tray selection job transmitted from a different user, during execution of a job in which a sheet feed tray 182 other than the manual feed tray 181 is specified in the sheet feed source information 113*a*, when a sheet is newly set in the manual feed tray 181 during standby of printing of the automatic tray selection job, the detection unit 105 detects that a sheet is newly set in the manual feed tray 181, and the update unit 107 may reset the user information.

(2) Operation of Printing by Image Forming Apparatus 1

Figure 4A:
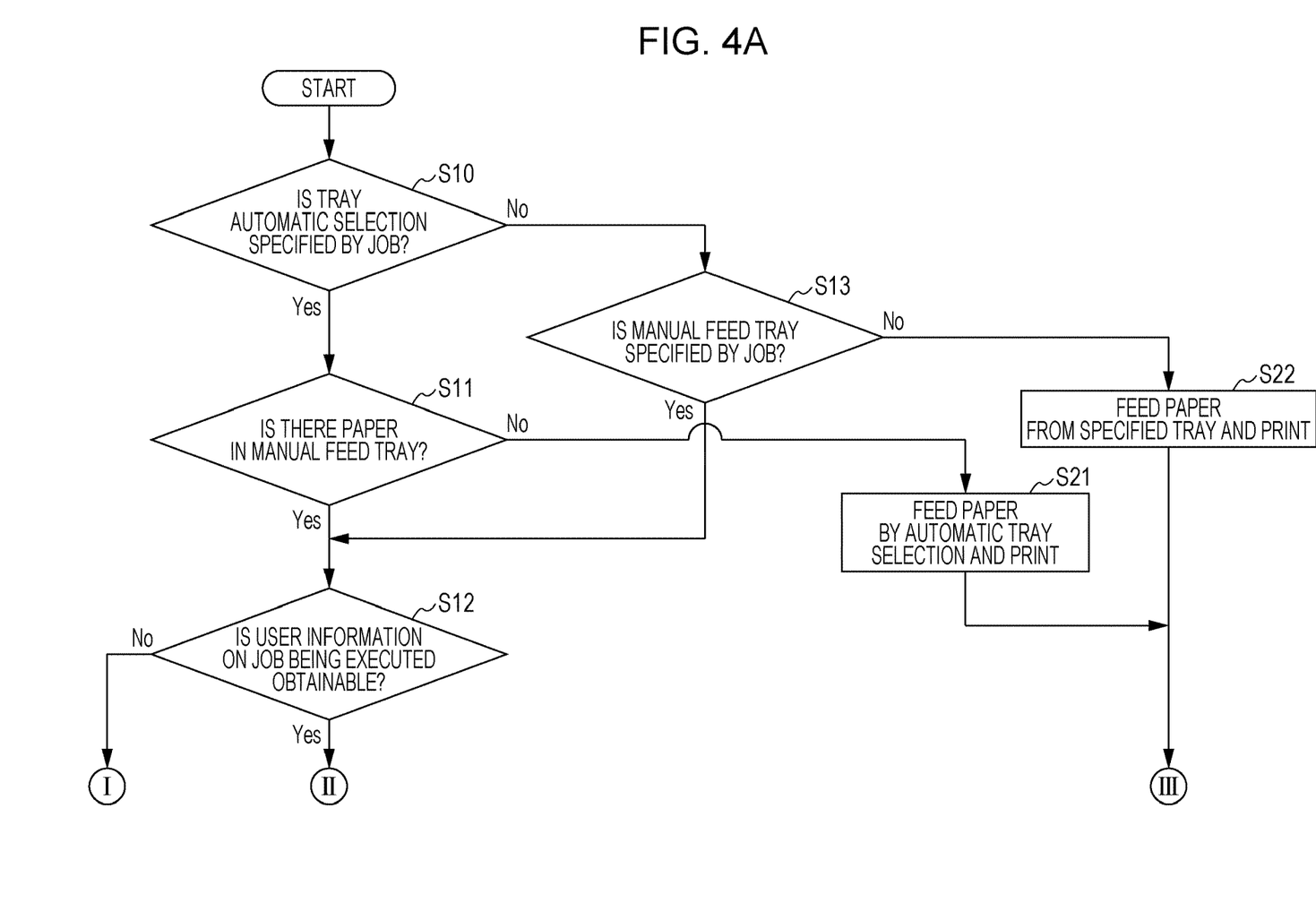
FIGS. 4A and 4B are a flowchart illustrating an example of an operation of printing by the image forming apparatus illustrated in FIG. 1.
Figure 4B:
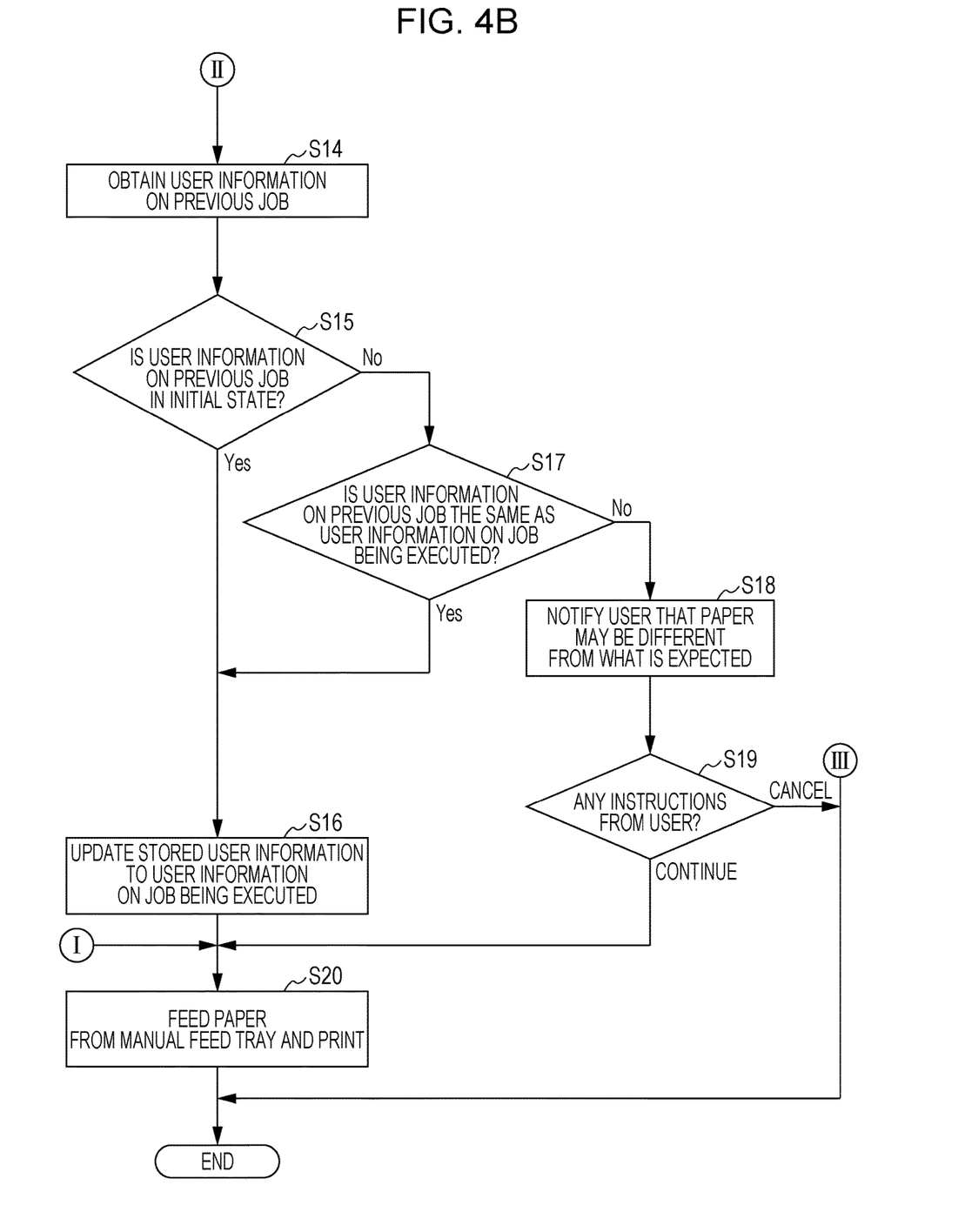

FIG. 4 is a flowchart illustrating an example of the operation of printing by the image forming apparatus 1. When "tray automatic selection" is specified by a job (Yes in S10), the detection unit detects whether a sheet is present in the manual feed tray (S11). When a sheet is present in the manual feed tray (Yes in S11), the confirmation unit 102 confirms whether the user information of the job being executed is obtainable (S12).

Even when "tray automatic selection" is not specified by the job (No in S10), when the manual feed tray is specified as the sheet feed source in the job, in other words, when "manual feed tray" is specified in the sheet feed source information 113a included in the job information 113 (Yes in S13), the confirmation unit 102 similarly confirms whether the user information of the job being executed is obtainable (S12).

When the user information of the job being executed is obtainable (Yes in S12), the obtaining unit 103 obtains the user information (in other words, the current user information) on the job being executed (S14).

The comparison unit 104 confirms whether the user information of the previous job obtained by the obtaining unit 103 is in the initial state (S15). When the user information of the previous job is in the initial state (Yes in S15), the update unit 107 updates the user information (hereinafter also referred to as the stored user information) of the previous job in the initial state to the user information of the job being executed (S16).

When the user information of the previous job is not in the initial state (No in S15), the comparison unit 104 compares the user information of the previous job with the user information of the job being executed (S17).

When the user information of the previous job and the user information of the job being executed are the same (in other words, when the current job is being executed from instructions by the same user who has executed the previous job) (Yes in S17), as described above, the update unit 107 updates the stored user information to the user information of the job being executed (S16).

When the user information of the previous job and the user information of the job being executed are not the same (in other words, when the current job is being executed from instructions by a user different from the user who has executed the previous job) (No in S17), the user is notified that there is a possibility that an expected sheet may not be used (S18). Specifically, the display control unit 108 performs control so that the above-described confirmation screen 8 is displayed on the display surface of the operation display 12.

When an instruction of cancelling the execution of the job is issued by an operation of the confirmation screen 8 (cancel in S19), in other words, when the selection button 811 "YES" on the displayed confirmation screen 8 is operated, the execution unit 106 cancels the execution of printing of the job.

When an instruction of continuing the execution of the job is issued by an operation of the confirmation screen 8 (continue in S19), in other words, when the selection button 812 "NO" on the displayed confirmation screen 8 is operated, as described above, the update unit 107 updates the stored user information to the user information of the job being executed (S16).

Next, the execution unit 106 controls the sheet feed section 18 and the image output 15, then performs execution of printing in accordance with the job information 113. Specifically, the execution unit 106 performs printing by feeding a sheet from the manual feed tray 181 (S20). More specifically, the execution unit 106 controls the manual feed tray 181 to feed a sheet, then performs printing on the sheet fed from the manual feed tray 181.

It is to be noted that when "tray automatic selection" is specified by the job (Yes in S10), and a sheet is not present in the manual feed tray 181 (No in S11), the execution unit 106 feeds a sheet from a sheet feed source specified in the automatic tray selection, and performs printing (S21).

When the tray automatic selection is not specified by the job (No in S10), and the manual feed tray 181 is not specified by the job either (No in S13), in other words, when a specific sheet feed tray 182 other than the manual feed tray 181 is specified in the sheet feed source information 113a by the job, the execution unit 106 feeds a sheet from the tray which is specified (hereinafter also referred to as the "specified tray") and performs printing (S22).

When the user information of the job being executed is not obtainable (No in S12), the execution unit 106 performs printing by the method specified as in the initial state. In short, the execution unit 106 feeds a sheet from the manual feed tray 181 to perform printing (S20).

In the above-described case where the reception unit 100 receives an automatic tray selection job transmitted from a user different from the user who has instructed the job, during execution of a job in which a sheet feed tray 182 other than the manual feed tray 181 is specified in the sheet feed source information 113a, when the detection unit 105 detects that a sheet is newly set in (in other words, added to) the manual feed tray 181 during standby of printing of the automatic tray selection job, and the update unit 107 resets the user information, the confirmation unit 102 does not need to perform the above-described confirmation exceptionally. In this case, the execution unit 106 feeds a sheet from the manual feed tray 181 to perform printing.

Although the exemplary embodiment of the present disclosure has been described above, the exemplary embodiment of the present disclosure is not limited to the above-described exemplary embodiment, and various changes and implementations may be made within a scope not departing from the spirit of the present disclosure.

Part of all of the units of the controller 10 may be configured by a hardware circuit such as a field programmable gate array (FPGA), and an application specific integrated circuit (ASIC).

Part of the components of the exemplary embodiment may be omitted or changed within a scope not departing from the spirit of the present disclosure. Addition, deletion, change, and replacement of steps may be made in the flow of the exemplary embodiment within a scope not departing from the spirit of the present disclosure. The program used in the exemplary embodiment may be recorded in a computer-readable recording medium, such as a CD-ROM, and provided. It is also possible to store the program in an external server such as a cloud server, and utilize the program via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    a processor programmed to function as:

an execution unit that, when a specific execution instruction is received, which specifies that a manual sheet feed section via which a sheet is fed manually is included as a sheet feed source that feeds the sheet, under a condition that the sheet is present in the manual sheet feed section, executes specific printing by preferentially feeding the sheet from the manual sheet feed section;

an identifying unit that identifies an instructor that instructs the specific execution instruction; and a confirmation unit that, when the execution unit executes first specific printing according to a first specific execution instruction by a first instructor, then receives a second specific execution instruction from a second instructor identified to be different from the first instructor by the identifying unit, under a condition that the sheet is present in the manual sheet feed section, confirms with the second instructor whether the sheet is allowed to be fed from the manual sheet feed section before the execution unit executes second specific printing according to the second specific execution instruction.

2. The image forming apparatus according to claim 1, wherein when it is specified by the second specific execution instruction that the sheet feed source is selected according to an attribute of an object to be printed, the confirmation unit confirms whether a sheet is allowed to be fed from the manual sheet feed section.

3. The image forming apparatus according to claim 2, wherein when the manual sheet feed section is specified as the sheet feed source by the second specific execution instruction, the confirmation unit confirms whether a sheet is allowed to be fed from the manual sheet feed section.

4. The image forming apparatus according to claim 3, wherein in the case where the specific execution instruction from the second instructor is received during execution of printing by the execution unit according to an execution instruction in which a sheet feed section other than the manual sheet feed section is specified as the sheet feed source, when the sheet is set in the manual sheet feed section, the execution unit executes printing according to the specific execution instruction without making confirmation by the confirmation unit.

5. The image forming apparatus according to claim 2, wherein in the case where the specific execution instruction from the second instructor is received during execution of printing by the execution unit according to an execution instruction in which a sheet feed section other than the manual sheet feed section is specified as the sheet feed source, when the sheet is set in the manual sheet feed section, the execution unit executes printing according to the specific execution instruction without making confirmation by the confirmation unit.

6. The image forming apparatus according to claim 4, wherein in the case where the sheet is present in the manual sheet feed section during execution of printing by the execution unit according to the execution instruction, when the specific execution instruction from the second instructor is received, and the sheet is newly set in the manual sheet feed section, the execution unit executes printing according to the specific execution instruction without making confirmation by the confirmation unit.

7. The image forming apparatus according to claim 5, wherein in the case where the sheet is present in the manual sheet feed section during execution of printing by the execution unit according to the execution instruction, when the specific execution instruction from the second instructor is received, and the sheet is newly set in the manual sheet feed section, the execution unit executes printing according to the specific execution instruction without making confirmation by the confirmation unit.

8. The image forming apparatus according to claim 1, wherein in the case where the specific execution instruction from the second instructor is received during execution of printing by the execution unit according to an execution instruction in which a sheet feed section other than the manual sheet feed section is specified as the sheet feed source, when the sheet is set in the manual sheet feed section, the execution unit executes printing according to the specific execution instruction without making confirmation by the confirmation unit.

9. The image forming apparatus according to claim 8, wherein in the case where the sheet is present in the manual sheet feed section during execution of printing by the execution unit according to the execution instruction, when the specific execution instruction from the second instructor is received, and the sheet is newly set in the manual sheet feed section, the execution unit executes printing according to the specific execution instruction without making confirmation by the confirmation unit.

10. A non-transitory computer readable medium storing a program causing a computer to execute a process comprising:

when a specific execution instruction is received, which specifies that a manual sheet feed section via which a sheet is fed manually is included as a sheet feed source that feeds the sheet, under a condition that the sheet is present in the manual sheet feed section, executing specific printing by preferentially feeding the sheet from the manual sheet feed section;

identify an instructor that instructs the specific execution instruction; and when first specific printing is executed according to a first specific execution instruction by a first instructor, then a second specific execution instruction is received from a second instructor identified to be different from the first instructor, under a condition that the sheet is present in the manual sheet feed section, confirming with the second instructor whether the sheet is allowed to be fed from the manual sheet feed section before second specific printing is executed according to the second specific execution instruction.

11. An image forming apparatus comprising:

execution means for, when a specific execution instruction is received, which specifies that a manual sheet feed section via which a sheet is fed manually is included as a sheet feed source that feeds the sheet, under a condition that the sheet is present in the manual sheet feed section, executing specific printing by preferentially feeding the sheet from the manual sheet feed section;

identification means for identifying an instructor that instructs the specific execution instruction; and confirmation means for, when the execution unit executes first specific printing according to a first specific execution instruction by a first instructor, then receives a second specific execution instruction from a second instructor identified to be different from the first instructor by the identifying means, under a condition that the sheet is present in the manual sheet feed section, confirming with the second instructor whether the sheet is allowed to be fed from the manual sheet feed section before the execution unit executes second specific printing according to the second specific execution instruction.

* * * * *